United States Patent
Nakaishi et al.

(10) Patent No.: US 11,069,901 B2
(45) Date of Patent: Jul. 20, 2021

(54) ELECTRODE FOR REDOX FLOW BATTERY, AND REDOX FLOW BATTERIES

(71) Applicant: Sumitomo Electric Industries, Ltd., Osaka (JP)

(72) Inventors: Hiroyuki Nakaishi, Osaka (JP);
Hirokazu Kaku, Osaka (JP);
Shinichiro Mukobata, Shibukawa (JP);
Tomomi Utsumi, Shibukawa (JP);
Megumi Sato, Shibukawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 155 days.

(21) Appl. No.: 16/076,132

(22) PCT Filed: Jan. 12, 2017

(86) PCT No.: PCT/JP2017/000732
§ 371 (c)(1),
(2) Date: Aug. 7, 2018

(87) PCT Pub. No.: WO2017/138287
PCT Pub. Date: Aug. 17, 2017

(65) Prior Publication Data
US 2020/0152997 A1    May 14, 2020

(30) Foreign Application Priority Data
Feb. 10, 2016    (JP) .............................. JP2016-024170

(51) Int. Cl.
*H01M 4/90*    (2006.01)
*H01M 4/86*    (2006.01)
(Continued)

(52) U.S. Cl.
CPC ....... *H01M 4/9016* (2013.01); *H01M 4/8673* (2013.01); *H01M 4/96* (2013.01); *H01M 8/188* (2013.01)

(58) Field of Classification Search
CPC .... H01M 4/9016; H01M 4/8673; H01M 4/96; H01M 8/188
See application file for complete search history.

(56) References Cited

U.S. PATENT DOCUMENTS

| | | |
|---|---|---|
| 4,786,567 A | 11/1988 | Skyllas-Kazacos et al. |
| 2003/0194557 A1* | 10/2003 | Wilde .................... D21H 13/50 428/408 |

(Continued)

FOREIGN PATENT DOCUMENTS

| | | |
|---|---|---|
| EP | 2447395 A2 | 5/2012 |
| JP | S62-186473 A | 8/1987 |

(Continued)

*Primary Examiner* — Sarah A. Slifka
*Assistant Examiner* — Patrick Marshall Greene
(74) *Attorney, Agent, or Firm* — Baker Botts L.L.P.; Michael A. Sartori

(57) ABSTRACT

An electrode for a redox flow battery includes a substrate, a conductive portion applied to a surface of the substrate, and a catalytic portion held by the conductive portion, the conductive portion containing one or more types of elements selected from the group α1 consisting of Sn, Ti, Ta, Ce, In, and Zn, the catalytic portion containing one or more types of elements selected from the group β consisting of Ru, Ir, Pd, Pt, Rh, and Au.

11 Claims, 7 Drawing Sheets

(51) Int. Cl.
*H01M 4/96* (2006.01)
*H01M 8/18* (2006.01)

(56) References Cited

U.S. PATENT DOCUMENTS

| | | | |
|---|---|---|---|
| 2013/0177789 A1* | 7/2013 | Kampanatsanyakorn | ................... H01M 8/188 429/70 |
| 2017/0025698 A1* | 1/2017 | Shishikura | .......... H01M 4/9041 |

FOREIGN PATENT DOCUMENTS

| | | | |
|---|---|---|---|
| JP | 2002-246035 A | | 8/2002 |
| JP | 2002246035 A | * | 8/2002 |
| JP | 3617237 B2 | * | 2/2005 |
| JP | 2006008472 A | * | 1/2006 |
| JP | 2011-253626 A | | 12/2011 |
| JP | 2015-228364 A | | 12/2015 |
| WO | 2006/091443 A2 | | 8/2006 |
| WO | 2008/070482 A2 | | 6/2008 |
| WO | 2012/006479 A2 | | 1/2012 |
| WO | 2012-020277 A1 | | 2/2012 |
| WO | 2015/156076 A1 | | 10/2015 |

* cited by examiner

ELECTRODE FOR REDOX FLOW BATTERY, AND REDOX FLOW BATTERIES

TECHNICAL FIELD

The present invention relates to an electrode comprised in a redox flow battery and a redox flow battery comprising the electrode. The present application claims priority based on Japanese Patent Application No. 2016-024170 filed on Feb. 10, 2016. The entire contents of the Japanese patent application are incorporated herein by reference.

BACKGROUND ART

As one of large-capacity storage batteries is known a redox flow battery (hereinafter also referred to as an RF battery) that supplies an electrolyte to an electrode to perform a cell reaction. Applications of the RF battery include load leveling, as well as momentary drop compensation and backup power supply, and smoothing an output of natural energy such as solar power generation, wind power generation and the like whose massive introduction is promoted.

Typically, the RF battery includes as a main constituent element a battery cell including a positive electrode supplied with a positive electrode electrolyte, a negative electrode supplied with a negative electrode electrolyte, and a diaphragm interposed between the positive electrode and the negative electrode. For large-capacity applications, what is called a cell stack composed of a plurality of battery cells stacked in layers and clamped to some extent, is used.

For the positive and negative electrodes, a carbon fiber aggregate having chemical resistance, providing electrical conduction, and having liquid permeability is often used (see Patent Document 1).

CITATION LIST

Patent Document

PTD 1: Japanese Patent Laying-Open No. 2002-246035

SUMMARY OF INVENTION

An electrode for a redox flow battery according to one aspect of the present disclosure comprises a substrate, a conductive portion applied to a surface of the substrate, and a catalytic portion held by the conductive portion, the conductive portion containing one or more types of elements selected from a group α1 consisting of Sn, Ti, Ta, Ce, In, and Zn, the catalytic portion containing one or more types of elements selected from a group β consisting of Ru, Ir, Pd, Pt, Rh, and Au.

A redox flow battery according to one aspect of the present disclosure is a redox flow battery electrically charged/discharged as a positive electrode electrolyte and a negative electrode electrolyte are supplied to a battery cell comprising a positive electrode, a negative electrode, and a diaphragm interposed between the positive electrode and the negative electrode, the positive electrode being the electrode for the redox flow battery according to one aspect of the present disclosure, the negative electrode being a carbon fiber aggregate.

DETAILED DESCRIPTION

Figure 1:
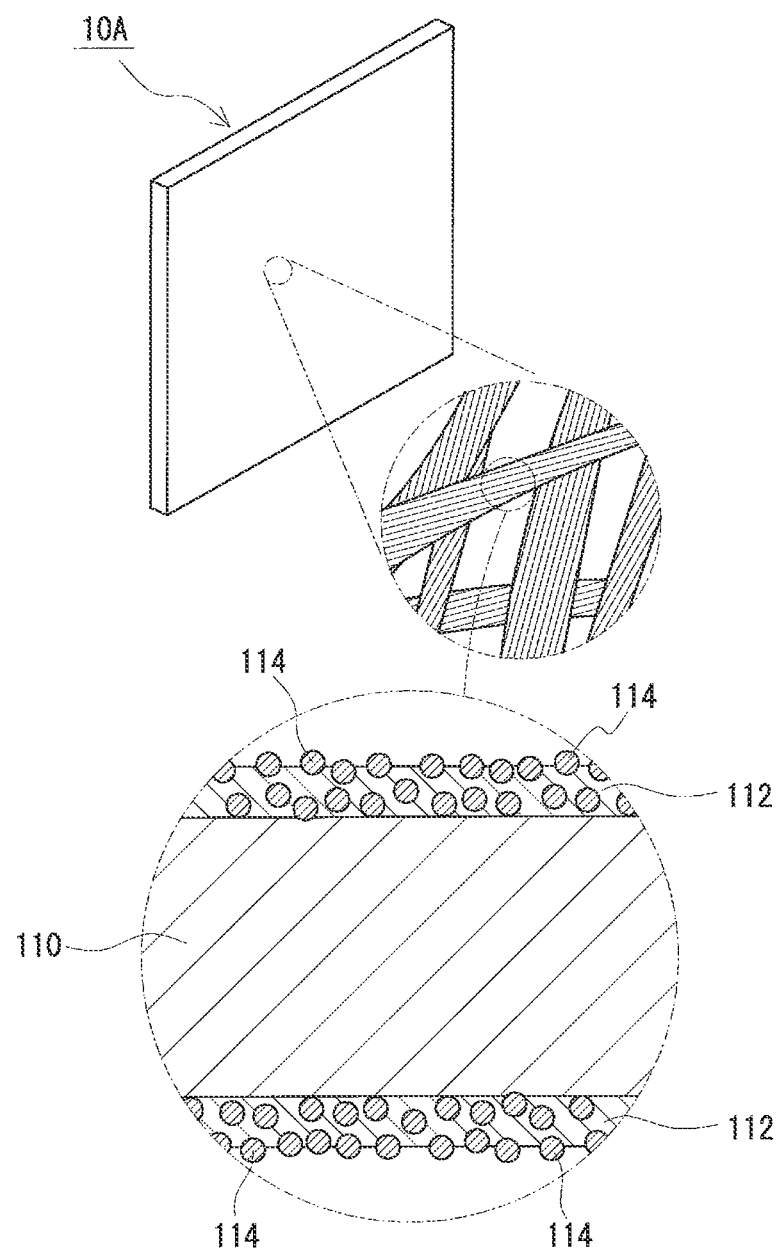
FIG. 1 is a schematic diagram showing an electrode comprised in a redox flow battery according to a first embodiment.

Problem to be Solved by the Present Disclosure

A redox flow battery is desired to have small cell resistivity over a long period of time. Further, an electrode capable of constructing such a redox flow battery is desired.

When a redox flow battery is operated over a long period of time with its positive electrode composed of a carbon fiber aggregate, the positive electrode is oxidized and hence degraded in the electrolyte, which may invite increased cell resistivity.

The present disclosure has been made in view of the above circumstances, and an object of the present disclosure is to provide an electrode provided for a redox flow battery and capable of suppressing degradation over time and allowing the redox flow battery to be constructed with small cell resistivity. Another object of the present disclosure is to provide a redox flow battery comprising the electrode for the redox flow battery.

Advantageous Effect of the Present Disclosure

The above electrode for a redox flow battery can suppress degradation over time and thus allows the redox flow battery to be constructed with small cell resistivity.

Further, the above redox flow battery can suppress degradation over time and have small cell resistivity.

DESCRIPTION OF EMBODIMENTS

Initially, the contents of the embodiments of the present disclosure will be enumerated.

(1) An electrode for a redox flow battery according to an embodiment of the present disclosure comprises a substrate, a conductive portion applied to a surface of the substrate, and a catalytic portion held by the conductive portion, the conductive portion containing one or more types of elements selected from a group α1 consisting of Sn, Ti, Ta, Ce, In, and Zn, the catalytic portion containing one or more types of elements selected from a group β consisting of Ru, Ir, Pd, Pt, Rh, and Au.

The conductive portion is composed of an element of group α1, which is an element resistant to oxidation and hence degradation. The above electrode for a redox flow battery that has on a surface of the substrate a conductive portion resistant to oxidation and hence degradation allows the redox flow battery to be operated over a long period of time with the substrate resistant to oxidation and hence degradation. The conductive portion holds a catalytic portion, and the electrode for the redox flow battery thus allows excellent cell reactivity with an electrolyte to be presented. An element of group α1 constituting the conductive portion may per se also function as a catalyst. Furthermore, an element of group α1 constituting the conductive portion is an excellently adhesive element and can thus enhance adhesion of the catalytic portion to the substrate. Thus the above electrode for a redox flow battery can suppress secular degradation over a long period of time and allows excellent cell reactivity to be presented, and hence allows the redox flow battery to be constructed with small cell resistivity.

Note that when the conductive portion contains one type of element selected from group α1, the conductive portion contains that element as a simple substance, an oxide of the element, or both thereof. When the conductive portion contains a plurality of types of elements selected from group α1, the conductive portion contains the plurality of types of elements each as a simple substance, the plurality of types of elements each in the form of an oxide, a compound containing the plurality of types of elements, a solid solution containing the plurality of types of elements, or a combination thereof. The compound containing the plurality of types of elements includes a complex oxide containing the plurality of types of elements (hereinafter the same applies). For example, when a plurality of types of elements selected from group α1 are represented as X and Y, two types of elements as simple substances, respectively: X+Y, two types of oxides of the elements, respectively: $X_nO_m+Y_pO_q$, a compound containing two types of elements (i.e., a complex oxide): $(X_s,Y_t)$ O), are referred to. Similarly, when the catalytic portion contains one type of element selected from group β, the catalytic portion contains the element as a simple substance, an oxide of the element, or both thereof. When the catalytic portion contains a plurality of types of elements selected from group β, the catalytic portion contains the plurality of types of elements each as a simple substance, the plurality of types of elements each in the form of an oxide, a compound containing the plurality of types of elements, a solid solution containing the plurality of types of elements, or a combination thereof. The conductive portion and the catalytic portion may contain an element other than the elements of group α1 and the elements of group β, respectively. The conductive portion's constituent element(s) and the catalytic portion's constituent element(s) may be present as mutually independent elements as simple substances, a solid solution containing each element, a compound containing each element, or a combination thereof.

(2) An example of the above electrode for a redox flow battery is in a form such that the conductive portion and the catalytic portion have total constituent element contents, respectively, at a molar ratio of 30:70 to 95:5.

The conductive and catalytic portions having total constituent element contents, respectively, at a molar ratio falling within the above range ensure that the substrate has a surface coated with the conductive portion and the catalytic portion can also be held in the conductive portion in an appropriate amount.

(3) An example of the above electrode for a redox flow battery is furthermore in a form such that the conductive portion contains one or more types of elements selected from a group α2 consisting of Nb, Sb, Bi, and P.

The conductive portion containing an element of group α2 helps to enhance electrical conductivity and reactivity and hence durability. In a case where the conductive portion contains an element of group α2, when the conductive portion contains one type of element selected from group α2, the conductive portion contains that element as a simple substance, an oxide of the element, both thereof, a compound containing an element selected from group α1 and an element selected from group α2, a solid solution containing an element selected from group α1 and an element selected from group α2, or a combination thereof. When the conductive portion contains a plurality of types of elements selected from group α2, the conductive portion also includes a compound containing the plurality of types of elements selected, and a solid solution containing the plurality of types of elements selected.

(4) An example of the above electrode for a redox flow battery with the conductive portion containing one or more types of elements selected from group α2 is in a form such that the conductive portion has with respect to its total constituent element content a total group α2 constituent element content of 1 mol % or more and 20 mol % or less.

The conductive portion having with respect to its total constituent element content a total group α2 constituent element content of 1 mol % or more allows more suppression of oxidation and hence degradation of the substrate of the redox flow battery in a long-term operation, and can also enhance conductivity and reactivity, and hence durability. The conductive portion having with respect to its total constituent element content a total group α2 constituent element content of 20 mol % or less can sufficiently enhance conductivity and reactivity, and hence durability.

(5) An example of the above electrode for a redox flow battery is in a form such that the substrate contains one or more types of elements selected from Ti, Ta, Nb, and C.

The substrate composed of a material including Ti, Ta, Nb, and C is resistant to corrosion when the redox flow battery is operated over a long period of time.

(6) An example of the above electrode for a redox flow battery is in a form such that the substrate includes an aggregate of fibers having a transverse cross section with an equivalent circle diameter of 3 μm or more and 100 μm or less.

The substrate including an aggregate of fibers can have the fibers in contact with one another at a large number of points and thus facilitate enhancing conductivity, and ensures pores therein to facilitate an electrolyte to pass therethrough. A fiber having a transverse cross section with an equivalent circle diameter of 3 μm or more ensures that an aggregate of such fibers has strength. The fiber having a transverse cross section with an equivalent circle diameter of 100 μm or less allows an increased surface area per unit weight and hence a sufficient cell reaction.

(7) An example of the above electrode for a redox flow battery is in a form such that the substrate includes an aggregate of particles having an average particle size of 3 μm or more and 500 μm or less.

The substrate including an aggregate of particles can have the particles in contact with one another at a large number of points and thus facilitate enhancing conductivity, and ensures pores therein to facilitate an electrolyte to pass therethrough. The particle having an average particle size of 3 μm or more is easy to handle. The particle having an average particle size of 500 μm or less allows an increased surface area per unit weight and hence a sufficient cell reaction.

(8) An example of the above electrode for a redox flow battery is in a form such that the substrate has a porosity of more than 40% by volume and less than 98% by volume.

The substrate having a porosity of more than 40% by volume facilitates an electrolyte to pass therethrough. The substrate having a porosity of less than 98% by volume can be increased in density and hence enhanced in conductivity, and thus allows a sufficient cell reaction.

(9) An example of the above electrode for a redox flow battery is in a form such that it has a weight per unit area of 50 g/m$^2$ or more and 10000 g/m$^2$ or less.

The electrode having a weight per unit area of 50 g/m$^2$ or more allows a sufficient cell reaction. The electrode having a weight per unit area of 10000 g/m$^2$ or less can be prevented from having excessively small pores and thus easily suppress an increase in resistance against flow of an electrolyte.

(10) An example of the above-described electrode for a redox flow battery is in a form such that it has a thickness of 0.1 mm or more and 5 mm or less.

The electrode having a thickness of 0.1 mm or more allows a sufficient cell reaction. A redox flow battery using the electrode having a thickness of 5 mm or less can have a reduced thickness.

(11) A redox flow battery according to an embodiment of the present disclosure is a redox flow battery electrically charged/discharged as a positive electrode electrolyte and a negative electrode electrolyte are supplied to a battery cell comprising a positive electrode, a negative electrode, and a diaphragm interposed between the positive electrode and the negative electrode, the positive electrode being the electrode for the redox flow battery according to any one of items (1) to (10) above, the negative electrode being a carbon fiber aggregate.

The above redox flow battery that employs as a positive electrode an electrode for a redox flow battery according to an embodiment of the present disclosure can be operated over a long period of time while suppressing degradation with time and thus has a small cell resistivity.

(12) An example of the redox flow battery is in a form such that the positive electrode electrolyte and the negative electrode electrolyte contain an active material having an oxidation-reduction potential of 0.9 V or higher.

The active material having an oxidation-reduction potential of 0.9 V or higher allows a redox flow battery to be constructed with high electromotive force. A redox flow battery having high electromotive force has the positive electrode easily oxidized and hence degraded by a side reaction caused as the battery is electrically charged/discharged, and accordingly, the redox flow battery enjoys a benefit of an effect of using as the positive electrode the electrode for a redox flow battery according to an embodiment of the present disclosure.

Detailed Description of Embodiments of the Present Disclosure

Hereinafter, according to an embodiment of the present disclosure, an electrode comprised in a redox flow battery (RF battery), and an RF battery comprising the electrode will be described in detail with reference to the drawings. In the figures, identical reference characters denote identically named components.

Initially, with reference to FIGS. 3 and 4, a basic configuration of an RF battery system comprising an RF battery 1 according to an embodiment will be described, and subsequently, with reference to FIGS. 1 and 2, an RF battery electrode comprised in RF battery 1 of the embodiment will be described.

[Outline of RF battery]

Figure 3:
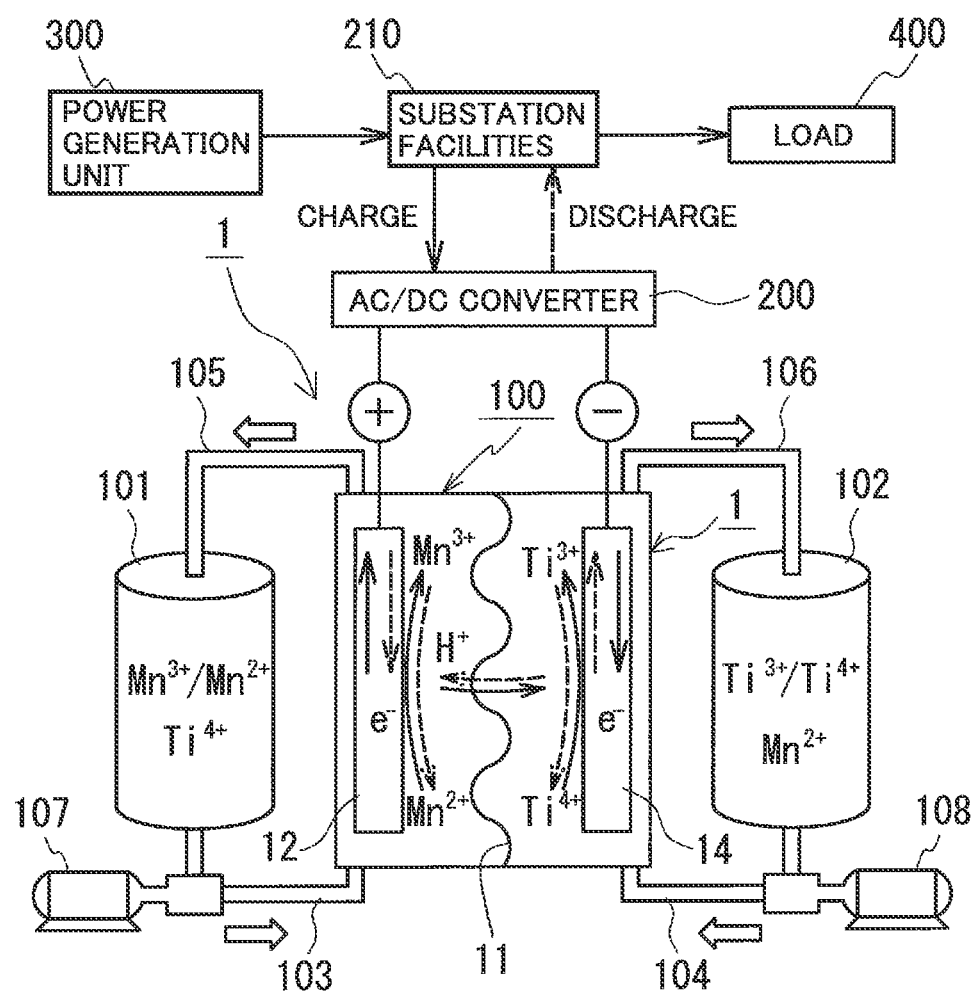
FIG. 3 illustrates a basic configuration of a redox flow battery system comprising a redox flow battery of an embodiment, and a basic operation principle thereof.

According to an embodiment, RF battery 1 is used in an RF battery system configured with a circulation scheme provided to circulate and thus supply an electrolyte to RF battery 1, as shown in FIG. 3. Typically, RF battery 1 is connected to a power generation unit 300 and a load 400 such as a power system or a customer via an AC/DC converter 200, substation facilities 210, and the like. RF battery 1 is electrically charged with power generation unit 300 serving as a power supply, and discharges power to load 400 serving as a power consumer. Power generation unit 300 may for example be a solar power generator, a wind power generator, and other general power plants.

[Basic Configuration of RF Battery]

RF battery 1 includes as a main constituent element a battery cell 100 comprising a positive electrode 12 supplied with a positive electrode electrolyte, a negative electrode 14 supplied with a negative electrode electrolyte, and a diaphragm 11 interposed between positive electrode 12 and negative electrode 14. Typically, RF battery 1 comprises a plurality of battery cells 100, and comprises a bipolar plate 160 (FIG. 4) between adjacent battery cells 100s.

Positive electrode 12 and negative electrode 14 are reaction fields in which active material ions contained in the supplied electrolytes perform a cell reaction. Diaphragm 11 is a positivity/negativity separation member separating positive electrode 12 and negative electrode 14 and transmitting predetermined ion. Bipolar plate 160 is a conductive member which is interposed between positive electrode 12 and negative electrode 14 and allows a current to pass therethrough and does not allow an electrolyte to pass therethrough. Typically, it is used in the form of a cell frame 16 comprising a framework 161 formed on a periphery of bipolar plate 160, as shown in FIG. 4. Framework 161 has front and rear surfaces with liquid feeding holes 163 and 164 to feed the electrolytes to electrodes 12 and 14 disposed on bipolar plate 160 and liquid draining holes 165 and 166 to drain the electrolytes.

The plurality of battery cells 100 are stacked in layers and used in a form called a cell stack. As shown in FIG. 4, the cell stack is formed by staking bipolar plate 160 of a cell frame 16, positive electrode 12, diaphragm 11, negative electrode 14, bipolar plate 160 of another cell frame 16, and so forth sequentially repeatedly in layers. For electrodes 12, 14 located at opposite ends of the cell stack in a direction in which battery cells 100 stacked in layers, a collector plate (not shown) is disposed instead of bipolar plate 160. Typically, end plates 170 are disposed at the opposite ends of the cell stack in the direction in which battery cells 100 stacked in layers, and paired end plates 170s are coupled together by a coupling member 172 such as a long bolt.

[Outline of RF Battery System]

The RF battery system comprises RF battery 1, and a positive electrode circulation path and a negative electrode circulation path, as will be described hereinafter, to circulate and thus supply a positive electrode electrolyte to positive electrode 12 and a negative electrode electrolyte to negative electrode 14 (see FIG. 3). As the electrolytes are thus circulated and supplied, RF battery 1 is electrically charged/discharged in accordance with a valence modification reaction of ions serving as an active material in the electrolyte for each electrode.

The positive electrode circulation path includes a positive electrode tank 101 for storing the positive electrode electrolyte to be supplied to positive electrode 12, pipes 103, 105 connecting between positive electrode tank 101 and RF battery 1, and a pump 107 provided to pipe 103 serving as a supplying side. Similarly, the negative electrode circulation path includes a negative electrode tank 102 for storing the negative electrode electrolyte to be supplied to negative electrode 14, pipes 104, 106 connecting between negative electrode tank 102 and RF battery 1, and a pump 108 provided to pipe 104 serving as a supplying side. By stacking a plurality of cell frames 16 in layers, liquid feeding holes 163 and 164 and liquid draining holes 165 and 166 (see FIG. 4) configure a pipe line to communicate the electrolytes, and pipes 103 to 106 are connected to the pipe line. The basic configuration of the RF battery system can be a known, appropriate configuration.

[Main Features of RF Battery]

One feature of RF battery 1 of the embodiment is to use an electrode which is resistant to oxidation and hence degradation and can reduce cell resistivity while RF battery 1 is operated over a long period of time. Specifically, the electrode is composed of a composite material including a substrate, a conductive portion applied to a surface of the substrate, and a catalytic portion held by the conductive portion. Hereinafter, an RF battery electrode included in RF battery 1 of the above embodiment will be described in detail.

First Embodiment

Figure 2:
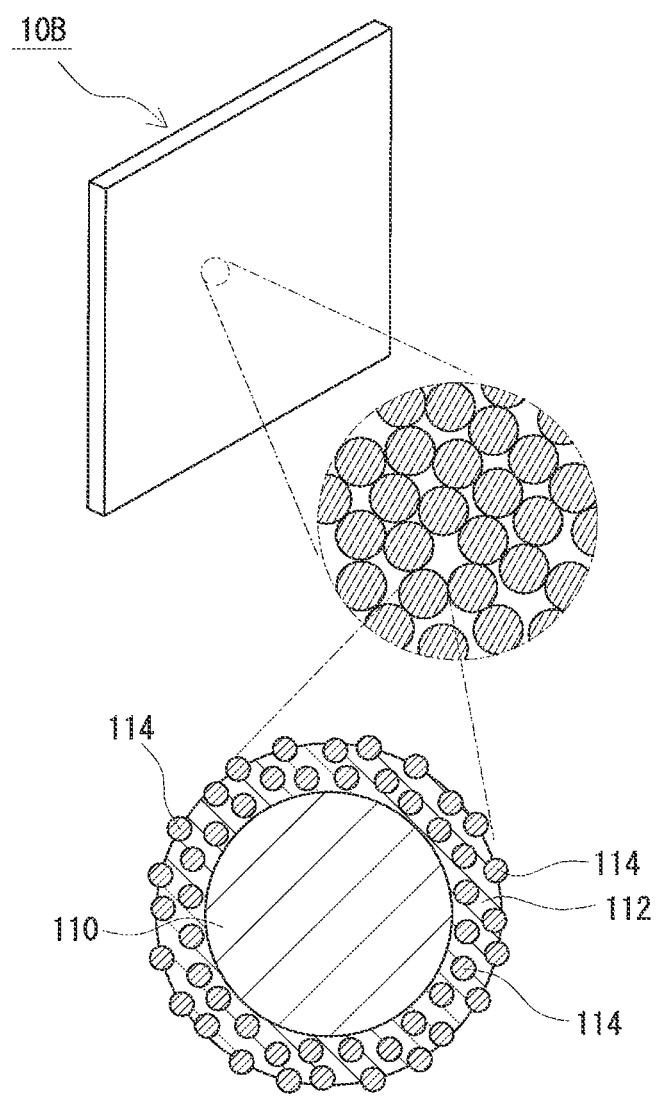
FIG. 2 is a schematic diagram showing an electrode comprised in a redox flow battery according to a second embodiment.

As shown in FIG. 1, an electrode 10A for an RF battery according to a first embodiment includes a fiber aggregate composed mainly of a plurality of intertwined fibers. FIG. 1 shows electrode 10A, and in the figure, the middle diagram is an enlarged view of a portion of electrode 10A, and the lower diagram is an enlarged longitudinal sectional view of each fiber constituting electrode 10A. As shown in the lower diagram of FIG. 1, electrode 10A includes a substrate 110, a conductive portion 112 applied to a surface of substrate 110, and a catalytic portion 114 held by conductive portion 112.

Substrate

Substrate 110 constitutes a base of electrode 10A. "Constituting a base" means that a proportion of a fiber aggregate (or electrode 10A) that is occupied by substrate 110 is 50% by mass or more. Substrate 110 contains one or more types of elements selected from Ti, Ta, Nb, and C. Substrate 110 may be made of a material composed of a single element or a material composed of an alloy or compound containing the above elements. Substrate 110 has the fiber aggregate occupied by fibers at a proportion varying with its structure (or a form of combining fibers). The fiber aggregate has fibers combined in forms, such as nonwoven fabric, woven fabric, paper, and the like, for example.

Substrate 110 is preferably composed of fibers each having a transverse cross section with an average diameter, as converted into an equivalent circle diameter, of 3 µm or more and 100 µm or less. The equivalent circle diameter is represented as $2\times(S/\pi)^{1/2}$, where S represents a cross-sectional area of each fiber constituting substrate 110. The fiber having an equivalent circle diameter of 3 µm or more ensures that an aggregate of such fibers has strength. The fiber having an equivalent circle diameter of 100 µm or less allows an increased surface area per unit weight and hence a sufficient cell reaction. The fiber more preferably has an equivalent circle diameter of 5 µm or more and 50 µm or less, particularly preferably 7 µm or more and 20 µm or less. An average diameter in transverse cross section of the fibers constituting substrate 110 is obtained as follows: electrode 10A is cut to expose a transverse cross section of the fibers and a microscope is used to examine 5 or more fields of view to measure three or more fibers for each field of view to obtain measurements which are in turn averaged to obtain the average diameter.

The fiber aggregate by substrate 110 preferably has a porosity of more than 40% by volume and less than 98% by volume. When the fiber aggregate has an apparent density p and a material density $\rho_0$, the fiber aggregate has a porosity of $(\rho_0-\rho)/\rho_0$. The fiber aggregate having a porosity of more than 40% by volume facilitates an electrolyte to pass therethrough. The fiber aggregate having a porosity of less than 98% by volume can be increased in density and hence enhanced in conductivity, and thus allows a sufficient cell reaction. The fiber aggregate by substrate 110 more preferably has a porosity of 60% by volume or more and 95% by volume or less, particularly preferably 70% by volume or more and 93% by volume or less.

Conductive Portion

Conductive portion 112 covers substantially the entire surface of substrate 110. Conductive portion 112 contains one or more types of elements selected from group α1 consisting of Sn, Ti, Ta, Ce, In, and Zn. Furthermore, conductive portion 112 can contain one or more types of elements selected from group α2 consisting of Nb, Sb, Bi, and P. When conductive portion 112 contains an element selected from group α1 as a simple substance, an oxide thereof, and/or a plurality of types of elements selected from the group, it may contain the plurality of types of elements each as a simple substance, the plurality of types of elements each in the form of an oxide, a compound containing the plurality of types of elements, a solid solution containing the plurality of types of elements, or a combination thereof. When conductive portion 112 contains an element selected from group α2, conductive portion 112 contains the element as a simple substance, an oxide of that element, a compound containing an element selected from group α1 and an element selected from group α2, a solid solution containing an element selected from group α1 and an element selected from group α2, or a combination thereof. In particular, conductive portion 112 often contains the same in the form of an oxide of one or more types of elements selected from group α1 (a group α2 element may be included). Conductive portion 112 may each contain an element other than those of group α1. Conductive portion 112 has a function of a protective film to suppress oxidation and hence degradation of substrate 110. Furthermore, conductive portion 112 has a function of a holding film to allow substrate 110 to hold catalytic portion 114, as will be described hereinafter.

Conductive portion 112 that contains an element of group α1 can effectively suppress oxidation and hence degradation of substrate 110 and also firmly hold catalytic portion 114 on substrate 110. Conductive portion 112's constituent element(s) and catalytic portion 114's constituent element(s) may be present as mutually independent elements as simple substances, a solid solution containing each element, a compound containing each element, or a combination thereof. Conductive portion 112 has a constituent element content with a group α1 element content preferably of 30 mol % or more and 90 mol % or less, more preferably 35 mol % or more and 80 mol % or less, particularly preferably 40 mol % or more and 70 mol % or less in order to coestablish corrosion resistance and electrical conduction.

Conductive portion 112 that contains an element of group α2 allows corrosion resistance and electrical conduction to be enhanced. When conductive portion 112 contains an element of group α2, conductive portion 112 preferably has with respect to its total constituent element content a total group α2 constituent element content of 1 mol % or more and 20 mol % or less. Conductive portion 112 that contains an element of group α2 within the above range allows electrical conduction and corrosion resistance to be enhanced, and can further suppress oxidation and hence degradation of substrate 110 and also ensures that catalytic portion 114 closely adheres to substrate 110. Conductive portion 112 more preferably has with respect to its total constituent element content a total group α2 constituent element content of 1.5 mol % or more and 15 mol % or less, particularly preferably 2.5 mol % or more and 12 mol % or less.

Conductive portion 112 has an average thickness of 0.1 μm or more and 100 μm or less. Conductive portion 112 having an average thickness of 0.1 μm or more helps to suppress oxidation and hence degradation of substrate 110. Conductive portion 112 having an average thickness of 100 μm or is less crackable, helps catalytic portion 114 to closely adhere to substrate 110, and can also prevent electrode 10A from having an increased thickness. Conductive portion 112 further has an average thickness of 0.15 μm or more and 80 μm or less, 0.2 μm or more and 50 μm or less, in particular. An average thickness of conductive portion 112 is obtained as follows: electrode 10A is cut to expose a transverse cross section of the fibers and a microscope is used to examine 3 or more fibers each at 5 or more different points to obtain measurements which are in turn averaged to obtain the average thickness.

Catalytic Portion

Catalytic portion 114 is held by conductive portion 112 to improve cell reactivity. Catalytic portion 114 contains one or more types of elements selected from group β consisting of Ru, Ir, Pd, Pt, Rh, and Au. When catalytic portion 114 contains an element selected from group as a simple substance, an oxide thereof, and/or a plurality of types of elements selected from the group, it may contain the plurality of types of elements each as a simple substance, the plurality of types of elements each in the form of an oxide, a compound containing the plurality of types of elements, a solid solution containing the plurality of types of elements, or a combination thereof. In particular, catalytic portion 114 often contains the same in the form of an element of group β as a simple substance, an oxide thereof, or a compound of each element's oxide. Typically, as shown in the lower part of FIG. 1, catalytic portion 114 is present in the form of particles over the entire area of conductive portion 112. Rather than in the form of particles, catalytic portion 114 may be present in the form of short fibers. Catalytic portion 114 may have a portion buried in conductive portion 112 and the remainder exposed from conductive portion 112 or may substantially entirely be buried in conductive portion 112. Conductive portion 112's constituent element(s) and catalytic portion 114's constituent element(s) may be present as mutually independent elements as simple substances, a solid solution containing each element, a compound containing each element, or a combination thereof.

A molar ratio of a total constituent element content of conductive portion 112 and a total constituent element content of catalytic portion 114 is preferably 30:70 to 95:5. Configuring conductive portion 112 and catalytic portion 114 within the above range ensures that substrate 110 has a surface covered with conductive portion 112, and also allows catalytic portion 114 to be held in conductive portion 112 in an appropriate amount. A molar ratio of a total constituent element content of conductive portion 112 and a total constituent element content of catalytic portion 114 is more preferably 30:70 to 80:20, particularly preferably 40:60 to 60:40.

Electrode 10A preferably has a weight per unit area of 50 $g/m^2$ or more and 10000 $g/m^2$ or less. Electrode 10A having a weight per unit area of 50 $g/m^2$ or more allows sufficient cell reaction. Electrode 10A having a weight per unit area of 10000 $g/m^2$ or less can be prevented from having excessively small pores and thus easily suppress an increase in resistance against flow of an electrolyte. Electrode 10A more preferably has a weight per unit area of 100 $g/m^2$ or more and 2000 $g/m^2$ or less, particularly preferably 200 $g/m^2$ or more and 700 $g/m^2$ or less.

Electrode 10A preferably has a thickness of 0.1 mm or more and 5 mm or less in a state with no external force acting thereon. Electrode 10A having a thickness of 0.1 mm or more can increase a cell reaction field in which a cell reaction is performed with an electrolyte. RF battery 1 using electrode 10A having a thickness of 5 mm or less can have a reduced thickness. Electrode 10A more preferably has a thickness of 0.2 mm or more and 2.5 mm or less, particularly preferably 0.3 mm or more and 1.5 mm or less.

Method of Manufacturing RF Battery Electrode

Electrode 10A for an RF battery as described above is obtained by preparing substrate 110 and a coating liquid containing conductive portion 112's constituent element(s) and catalytic portion 114's constituent element(s), applying the coating liquid to a surface of substrate 110, and applying a heat treatment thereto. Hereinafter, a method of manufacturing electrode 10A for an RF battery will be described in detail.

Preparing a Substrate

As substrate 110, an aggregate composed of fibers which contain one or more types of elements selected from Ti, Ta, Nb, and C and are intertwined is prepared. The fiber aggregate may be selected in size and shape, as appropriate, so that electrode 10A has a desired size and a desired shape. The fiber aggregate thus prepared is preferably blasted, etched and/or the like to have a surface increased in area and roughened. After being blasted and etched, the fiber aggregate has a surface selectively etched, and cleaned and activated. When the fiber aggregate is cleaned with acid, typically, sulfuric acid, hydrochloric acid, hydrofluoric acid, etc. are used, and the fiber aggregate can be activated by being immersed in these liquids to have a surface partially dissolved.

Preparing a Coating Liquid

A coating liquid containing a source material of elements constituting conductive portion 112 and catalytic portion 114, and an organic solvent is prepared. The source material of the elements includes metal alkoxides, chlorides, acetates, and organometallic compounds, specifically, tin tetrachloride, tin (IV) chloride pentahydrate, tin (II) chloride, tin (II) chloride dihydrate, tin (II) bis(2-ethylhexanoate), tin (II) bis(neodecanoate), n-butyltin (IV) trichloride, dibutyltin bis (acetylacetonate), tin (IV) di-n-butyl-di-n-butoxide, tin (IV)-n-butoxide, tin (IV)-t-butoxide, tetramethyltin, tin (II) acetate, tin (IV) acetate, titanium tetrachloride, titanium (IV) ethoxide, titanium (IV)-n-butoxide, titanium (IV)-t-butoxide, titanium (IV)-i-propoxide, titanium (IV)-n-propoxide, titanium (IV) monchloride-i-tripropoxide, titanium (IV)

methoxide, titanium (IV)-n-dibutoxide (bis-2,4-neodecanoate), titanium (IV) dichloride-diethoxide, titanium (IV)-i-dipropoxide (bis-2,4-pentanedionate), titanium (IV) 2-ethylhexanoate, titanium (IV) methylfetoxide, titanium (IV)-n-stearylside, antimony triacetate, antimony trichloride, antimony pentachloride, antimony (III) methoxide, antimony (III) ethoxide, antimony (III) butoxide, cerium (III) nitrate, cerium (III) chloride, cerium (III) chloride heptahydrate, cerium (IV)-i-propoxide, cerium (IV)-methoxyethoxide, cerium (III)-t-butoxide, cerium (III) 2-ethylhexanoate, tantalum pentachloride, tantalum (V)-n-butoxide, tantalum (V)-ethoxide, tantalum (V) methoxide, bismuth (III) acetate, bismuth (III) chloride, bismuth (III) benzoate, bismuth (III) nitrate pentahydrate, bismuth (V)-n-pentoxide, bismuth (III)-n-butoxide, bismuth (III) neodecanoate, indium trichloride, indium trichloride tetrahydrate, indium (III) acetate, indium (III)-i-propoxide, indium (III)-trimethoxyethoxide, indium (III) 2,4-pentanedionate indium (III) methyl (trimethyl) acetyl acetate, zinc diacetate, zinc diacetate dihydrate, zinc (II) methacrylate, zinc (II)-N,N-dimethylaminoethoxide, zinc (II) 2-ethylhexanoate, zinc (IV) 2-ethylhexanoate, zinc (II)-methoxyethoxide, zinc (IV) ethoxide, zinc (IV)-n-propoxide, zinc (IV)-i-propoxide, zinc (IV)-n-butoxide, zinc (IV)-t-butoxide, zinc (IV) 2-ethyl hexanoyl oxide, zinc (IV) methacrylate, phosphoric acid, polyphosphoric acid, phosphorous acid, dihexylphosphinic acid, hydrogen hexachloroiridate (IV) n-hydrate, iridium (III) chloride n-hydrate, iridium (III) chloride anhydrate, iridium (IV) nitrate, ammonium hexachloroiridate (IV), hexaammine iridium (III) hydroxide, ruthenium (III) chloride hydrate, ruthenium (III) nitrate, ruthenium (IV) oxide hydrate, palladium (II) chloride, palladium (II) nitrate, diammine dinitro palladium (II), palladium (II) acetate, tetraamminepalladium (II) dichloride, hydrogen hexachloroplatinate (IV) n-hydrate, ammonium hexachloroplatinate(IV), diammine dinitro platinum (II), platinum dichloride, platinum tetrachloride, tetraammine platinum (II) dichloride n-hydrate, tetraammineplatinum (II) hydroxide, hydrogen hexahydroxoplatinate (IV), rhodium (III) chloride trihydrate, rhodium (III) nitrate, chloroauric acid, and the like.

Examples of the organic solvent used for the coating liquid include methanol, ethanol, propyl alcohol, isopropanol, butanol, pentanol, hexanol and the like. The organic solvent is contained in an amount of 70% by mass or more and 95% by mass or less with respect to the entire coating liquid. Furthermore, the coating liquid may contain acetylacetone or the like as a stabilizer. The stabilizer is contained in an amount of 1% by mass or more and 10% by mass or less with respect to the entire coating liquid. A material containing the source material, the organic solvent and furthermore, the stabilizer is agitated in a nitrogen atmosphere for at least 1 hour and not more than 5 hours to obtain a coating liquid containing the constituent elements of conductive portion 112 and catalytic portion 114 as desired.

Coating and Heat Treatment

The obtained coating liquid is applied to a surface of the obtained fiber aggregate. The coating liquid is applied for example by brush coating, spraying, dipping, flow coating, roll coating, and the like. The fiber aggregate with the coating liquid applied thereto is placed in a gas containing an oxidizing gas, e.g., in the air, and undergoes a heat treatment at 300° C. or higher and 600° C. or lower for 10 minutes or more and 5 hours or less. Specifically, this heat treatment includes a first heat treatment and a second heat treatment. The first heat treatment is performed as follows: until conductive portion 112 and catalytic portion 114 are held in the fiber aggregate in a desired amount, applying the coating liquid and performing a heat treatment at 300° C. or higher and 500° C. or lower for 10 minutes or more and 2 hours or less are repeated. While more frequently repeating the first heat treatment allows conductive portion 112 and catalytic portion 114 to be contained in an increased amount, doing so increases conductive portion 112 in thickness and makes it crackable, resulting in poor adhesion between substrate 110 and catalytic portion 114. Accordingly, the first heat treatment is performed so that conductive portion 112 has a desired thickness. The second heat treatment is performed as follows: once conductive portion 112 and catalytic portion 114 have been held in the fiber aggregate in a desired amount, the second heat treatment is performed at 400° C. or higher and 600° C. or lower for 1 hour or more and 5 hours or less.

By the above heat treatments, conductive portion 112 and catalytic portion 114 have their constituent elements thermally diffused into and caused to penetrate the fiber aggregate. And conductive portion 112 with catalytic portion 114 dispersed and held therein coats a surface of each fiber constituting the fiber aggregate (or substrate 110).

Effect

Electrode 10A for an RF battery of the first embodiment comprising substrate 110 having a surface coated with conductive portion 112 allows RF battery 1 to be operated over a long period of time with substrate 110 resistant to oxidation and hence degradation and can contribute to suppressing an increase in cell resistivity of RF battery 1. As conductive portion 112 has catalytic portion 114 dispersed and held therein, catalytic portion 114 allows excellent cell reactivity to be exhibited, and RF battery 1 can be constructed with small cell resistivity. That is, electrode 10A for an RF battery of the first embodiment allows RF battery 1 to be constructed to be operated over a long period of time with small cell resistivity, and also allows a stable RF battery system to be constructed.

Figure 4:
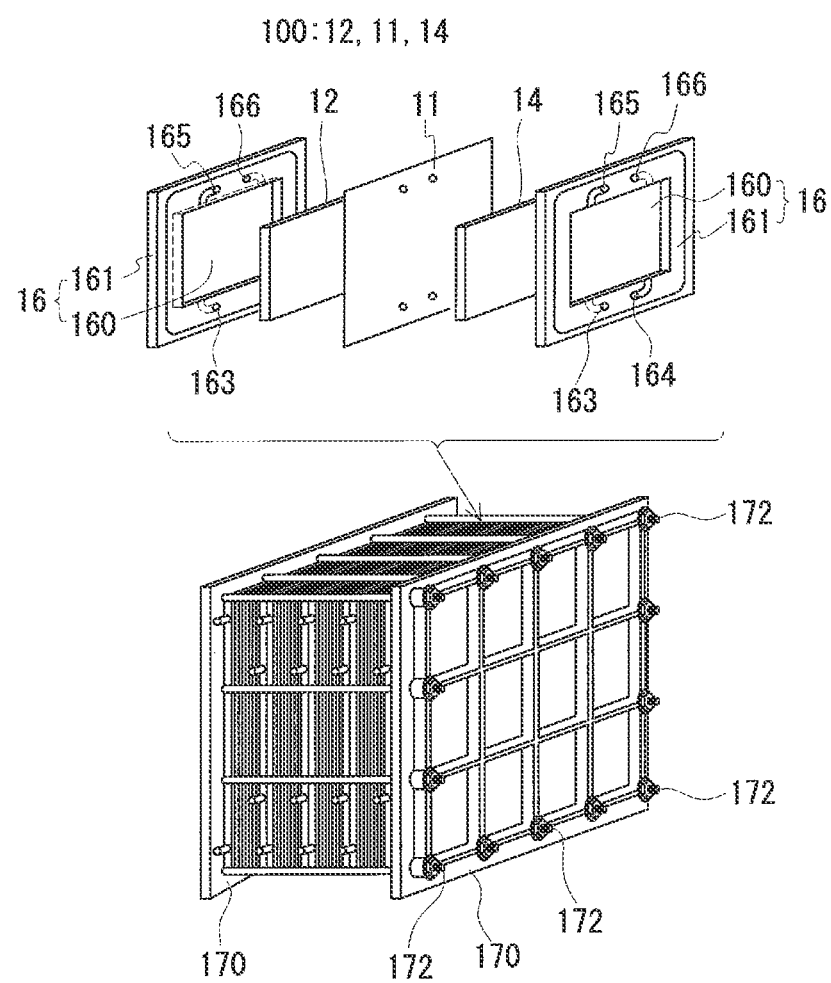
FIG. 4 schematically shows a configuration of an example of a cell stack comprised in a redox flow battery of an embodiment.

Electrode 10A for an RF battery according to the first embodiment can be suitably applied to positive electrode 12, in particular (see FIG. 4). When a carbon fiber aggregate is applied to both positive electrode 12 and negative electrode 14 (see FIG. 4), as conventional, and RF battery 1 is operated over a long period of time, the positive electrode is oxidized and hence degraded due to a side reaction caused as the battery is charged/discharged, which easily invites increased cell resistivity. Accordingly, in order to suppress the oxidation and hence degradation of the positive electrode, it has been necessary to set an upper limit such as, for example, about 1.5 V for the conduction voltage of RF battery 1. Applying electrode 10A for an RF battery according to the first embodiment to positive electrode 12 allows RF battery 1 to have a conduction voltage increased to more than 1.5 V, furthermore, 1.6 V or more, and particularly, 1.65 V or more, as the positive electrode is resistant to oxidation and hence degradation.

Second Embodiment

In the first embodiment, electrode 10A composed of a fiber aggregate has been described. Alternatively, as shown in FIG. 2, an electrode 10B comprising an aggregate of particles can be used as an electrode for an RF battery. Electrode 10B for the RF battery of the second embodiment is different from the first embodiment in that the former comprises substrate 110 composed of an aggregate of particles, and the former has the remainder identical to that of the first embodiment, such as substrate 110 having a surface coated with conductive portion 112 with catalytic portion 114 dispersed and held therein.

Substrate 110 is preferably composed of particles having an average particle size of 3 μm or more and 500 μm or less. When substrate 110 is composed of particles each having a volume V, the particle will have a size of $2\times(3V/4\pi)^{1/3}$, and an average value thereof will be an average particle size. A particle having an average particle size of 3 μm or more is easy to handle. A particle having an average particle size of 500 μm or less allows an increased surface area and hence a sufficient cell reaction. The average particle size is more preferably 10 μm or more and 300 μm or less, particularly preferably 50 μm or more and 200 μm or less.

Electrode 10B comprising substrate 110 that is an aggregate of particles can also be obtained in the same manufacturing method as in the first embodiment. Specifically, electrode 10B can be obtained by preparing substrate 110 and a coating liquid→applying the coating liquid to a surface of substrate 110 and subjecting the same to a heat treatment. Substrate 110 is an aggregate of particles containing one or more types of elements selected from Ti, Ta, Nb, and C, and is a shaped body of powder of the above element(s). A coating liquid containing the constituent elements of conductive portion 112 and catalytic portion 114 is applied to a surface of the shaped body (or substrate 110), and a heat treatment is applied thereto. The heat treatment is performed under the same conditions as in the first embodiment. By this heat treatment, the constituent elements of conductive portion 112 and catalytic portion 114 are thermally diffused into and caused to penetrate the shaped body, and, as shown in FIG. 2 by a lower diagram, there can be obtained electrode 10B composed of an aggregate of particles (or substrate 110) each having a surface coated with conductive portion 112 with catalytic portion 114 dispersed and held therein.

[Other Constituent Members of RF Battery]

Cell Frame

Bipolar plate 160 may be composed of a conductive material which has a small electrical resistance, does not react with an electrolyte and has resistance against the electrolyte (chemical resistance, acid resistance, etc.), and can for example be composed of a composite material containing a carbon material and an organic material. More specifically, it can be a plate of a conductive plastic including a conductive plastic containing a conductive inorganic material such as graphite (in the form of powder or fiber or the like) and an organic material such as a polyolefin-based organic compound or a chlorinated organic compound, or the like. Framework 161 is composed of a resin or the like exhibiting excellent resistance against an electrolyte, and excellent electrical insulation.

Diaphragm

Diaphragm 11 includes an ion exchange membrane such as a cation exchange membrane or an anion exchange membrane. The ion exchange membrane has characteristics such as being (1) excellent in providing isolation between ions of a positive electrode active material and ions of a negative electrode active material and (2) excellent in permeability for $H^+$ ion serving as a charge carrier in battery cell 100, and can suitably be used as diaphragm 11. A known diaphragm is applicable to diaphragm 11.

[Electrolyte]

An electrolyte used for RF battery 1 contains active material ion such as metal ion and non-metal ion. For example, a manganese-titanium based electrolyte containing manganese (Mn) ion as a positive electrode active material and titanium (Ti) ion as a negative electrode active material is referred to as an example (see FIG. 3). In addition, a vanadium-based electrolyte containing vanadium ions having different valences as a positive electrode active material and a negative electrode active material, and an iron-chromium based electrolyte containing iron (Fe) ion as a positive electrode active material and chromium (Cr) ion as a negative electrode active material, and the like are referred to. The electrolyte can, in addition to an active material, be an aqueous solution containing at least one type of acid selected from sulfuric acid, phosphoric acid, nitric acid and hydrochloric acid or a salt thereof. The positive electrode electrolyte and the negative electrode electrolyte preferably contain an active material having an oxidation-reduction potential of 0.9 V or more. An active material having an oxidation-reduction potential of 0.9 V or more allows RF battery 1 to be constructed with high electromotive force. RF battery 1 having high electromotive force has positive electrode 12 (see FIGS. 3 and 4) easily oxidized and hence degraded by a side reaction caused as the battery is electrically charged/discharged, and accordingly, RF battery 1 enjoys a benefit of an effect of using as positive electrode 12 electrode 10A, 10B for an RF battery according to the first and second embodiments.

Test Example 1

As the positive electrode, electrodes composed of various types of composite materials (fiber aggregates) were prepared, and how they varied with time was examined by observing cell resistivity.

Sample Nos. 1 to 7

An electrode composed of a composite material including a substrate, a conductive portion applied to a surface of the substrate, and a catalytic portion held by the conductive portion was prepared as the positive electrode.

Initially, as substrates, fiber aggregates were prepared each formed of a material and having a fiber diameter and a porosity, as shown in Table 1, and having a size of 30 mm×30 mm and a thickness of 2.5 mm (i.e., substrate Nos. 1 to 3). Each fiber aggregate was degreased with hexane, etched with an etchant having a hydrochloric acid concentration of 12 mol/L, and subsequently washed with pure water and dried.

Subsequently, coating liquids were prepared each containing a source material composed of constituent elements shown in Table 2 for the conductive portion and the catalytic portion, an organic solvent, and a stabilizer (i.e., coating liquids Nos. 1 to 6). The source materials shown in Table 2 for the constituent elements are tin tetrachloride, antimony (III) butoxide, ruthenium trichloride, iridium trichloride, palladium dichloride, platinum (IV) chloride, and titanium (IV) butoxide. As the organic solvent was used isopropanol containing 1 mass % of hydrochloric acid, and as the stabilizer was used acetylacetone. Each source material, the organic solvent and the stabilizer were blended so that a molar ratio of the source material:the organic solvent:the stabilizer was 2:10:1, and agitated for 1 hour in a nitrogen atmosphere to prepare a coating liquid.

The coating liquid was applied to a surface of the substrate with a brush and subsequently subjected to a heat treatment. Specifically, applying the coating liquid to the substrate and performing a heat treatment at 400° C. for 10 minutes until the conductive portion and the catalytic portion attained approximately 100 g/m² were repeated (i.e., the first heat treatment), and once the conductive portion and the catalytic portion had attained approximately 100 g/m², the second heat treatment was performed at 500° C. for 1 hour.

Sample Nos. 1 to 8 are each composed of a substrate and a coating liquid in combination, as shown in Table 3.

TABLE 1

| substrate No | material | fiber diameter (μm) | porosity (vol %) |
|---|---|---|---|
| 1 | carbon felt | 10 | 90 |
| 2 | carbon paper | 10 | 80 |
| 3 | Ti paper | 10 | 80 |

TABLE 2

| coating liquid No. | Constituent elements (mol %) | | | | | | |
|---|---|---|---|---|---|---|---|
| | Sn | Sb | Ti | Ru | Ir | Pd | Pt |
| 1 | 30 | — | — | 50 | 13 | 7 | — |
| 2 | 60 | 2 | — | 28 | 5 | 5 | — |
| 3 | 55 | 10 | — | 15 | 15 | — | 5 |
| 4 | 60 | — | — | 20 | 20 | — | — |
| 5 | 25 | — | — | 70 | — | — | 5 |
| 6 | — | — | 30 | 65 | — | — | 5 |

TABLE 3

| sample No. | substrate No. | coating liquid No. | weight per unit area (g/m²) |
|---|---|---|---|
| 1 | 1 | 1 | 50 |
| 2 | 2 | 1 | 15 |
| 3 | 3 | 1 | 80 |
| 4 | 3 | 2 | 100 |
| 5 | 3 | 3 | 100 |
| 6 | 3 | 4 | 100 |
| 7 | 3 | 5 | 100 |
| 8 | 3 | 6 | 100 |

Sample No. 101

As the positive electrode, substrate No. 1 was used. This substrate had a surface without the conductive or catalytic portion thereon. The electrode of sample No. 101 had a weight per unit area of 120.9 g/m².

Each obtained sample had been examined in cross section using a scanning electron microscope and an analyzer utilizing energy dispersive X-ray spectroscopy (SEM-EDX). As a result, it has been confirmed that in all of the samples, the substrate had a surface coated with the conductive portion holding the catalytic portion. Further, X-ray diffraction (XRD) was employed to measure a crystal structure and an X-ray microanalyzer (EPMA) was employed to measure an element composition to examine how the conductive portion and the catalytic portion are present, and a result shown in Table 4 was obtained. As a result, it has been found that the conductive portion contains one or more types of elements selected from Sn, Ti, Ta, Ce, In, Zn, Nb, Sb, B and P, and the catalytic portion contains one or more types of elements selected from Ru, Ir, Pd, Pt, Rh, and Au.

TABLE 4

| sample No. | conductive portion (mol %) | | | Catalytic portion (mol %) | | | |
|---|---|---|---|---|---|---|---|
| | $SnO_2$ | $Sb_2O_3$ | $TiO_2$ | $RuO_2$ | $IrO_2$ | PdO | Pt |
| 1 | 30 | — | — | 50 | 13 | 7 | — |
| 2 | 30 | — | — | 50 | 13 | 7 | — |
| 3 | 30 | — | — | 50 | 13 | 7 | — |
| 4 | 60.61 | 1.01 | — | 28.28 | 5.05 | 5.05 | — |
| 5 | 57.90 | 5.26 | — | 15.79 | 15.79 | — | 5.26 |
| 6 | 60 | — | — | 20 | 20 | — | — |
| 7 | 25 | — | — | 70 | — | — | 5 |
| 8 | — | — | 30 | 65 | — | — | 5 |
| 101 | — | — | — | — | — | — | — |

Electrodes of Sample Nos. 1 to 7 thus obtained were each (1) immersed in an electrolyte and immediately used to measure cell resistivity, which will be described hereinafter, and (2) immersed in an electrolyte (a Mn-based electrolyte at 75° C.) for 14 days and used to measure cell resistivity, which will be described hereinafter, to obtain a difference therebetween to observe variation with time.

[Cell Resistivity]

The positive and negative electrodes and diaphragm as described above were used to fabricate a single unit cell battery cell. As the negative electrode, an electrode composed of a carbon felt (substrate No. 1) similar to the positive electrode of sample No. 101 was used. As the electrolyte, for the positive electrode electrolyte, an electrolyte containing active material with manganese ion contained therein was used. The fabricated battery cell was charged and discharged with a constant current having a current density of 70 mA/cm². In this test, when a preset, prescribed switching voltage is reached, charging is switched to discharging, and a plurality of cycles of charging and discharging were thus performed. After each cycle of charging and discharging, each sample's cell resistivity ($\Omega \cdot cm^2$) was obtained. The cell resistivity was obtained as follows: an average voltage during charging and an average voltage during discharging in any one of the plurality of cycles were obtained and an average voltage difference/(average current/2)×effective cell area was calculated as the cell resistivity. Regarding the cell resistivity, Table 5 shows (1) that a cell resistivity for each electrode used immediately after immersing it in an electrolyte was started (i.e., at day 0 of immersion) serves as a reference (i.e., 1.00) and (2) a cell resistivity increase rate for the electrode used after it had been immersed for 14 days in the electrolyte.

TABLE 5

| sample No. | cell resistivity increase rate | | |
|---|---|---|---|
| | immersion at day 0 | immersion at day 7 | immersion at day 14 |
| 1 | 1.0 | 1.3 | 1.5 |
| 2 | 1.0 | 1.28 | 1.29 |
| 3 | 1.0 | 1.1 | 1.1 |
| 4 | 1.0 | 1.05 | 1.05 |
| 5 | 1.0 | 1.02 | 1.04 |
| 6 | 1.0 | 1.1 | 1.1 |
| 7 | 1.0 | 1.5 | 1.8 |
| 101 | 1.0 | 1.4 | 1.8 |

As shown in Table 5, sample no. 1 presented a cell resistivity increase rate of about 50%, sample No. 2 presented a cell resistivity increase rate of about 29%, sample no. 3 presented a cell resistivity increase rate of about 10%, sample No. 4 presented a cell resistivity increase rate of about 5%, sample No. 5 presented a cell resistivity increase rate of about 4%, sample No. 6 presented a cell resistivity increase rate of about 10%, sample No. 7 presented a cell resistivity increase rate of about 80%, and sample No. 101 presented a cell resistivity increase rate of about 80%. From this result, it has been found that when a case in which the positive electrode is any of the electrodes of sample Nos. 1 to 6 including a substrate coated within a specific range with the conductive portion holding the catalytic portion is compared with a case in which the electrode of sample Nos. 101 that does not include the catalytic portion or the conductive portion is used and a case in which the electrode of sample No. 7 with the catalytic portion provided in an excessive amount relative to the conductive portion is used, the former can reduce cell resistivity. In particular, it has been found that cell resistivity can significantly be reduced by using paper such as carbon paper or Ti paper as the substrate.

Test Example 2

Figure 5:
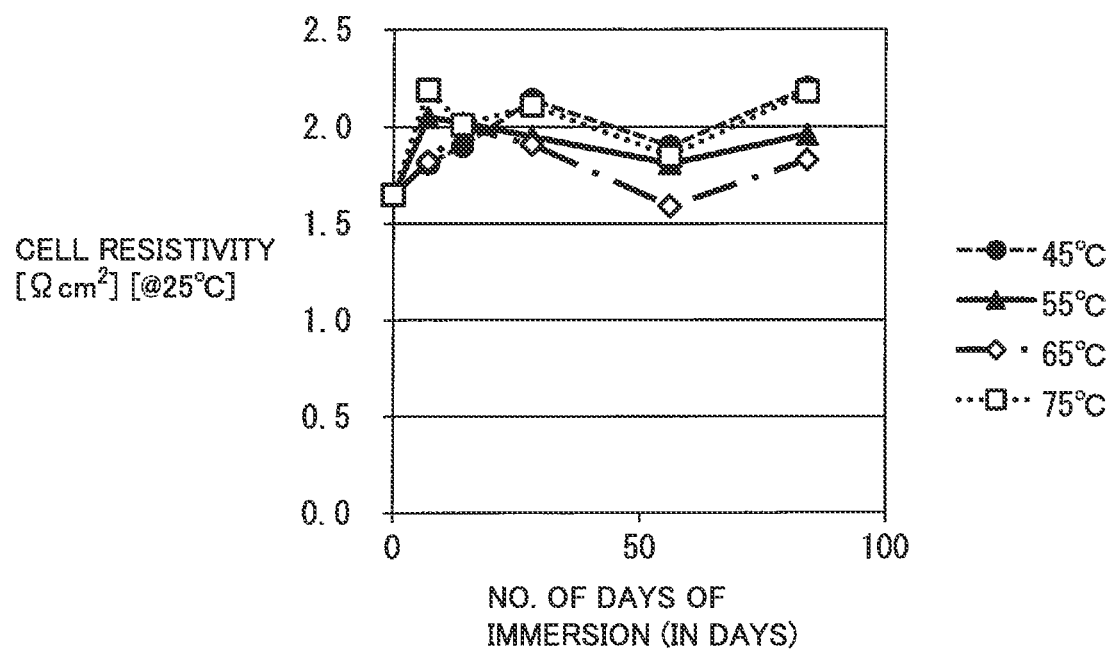
FIG. 5 is a graph representing how cell resistivity varies with time in an exemplary test 2.

Sample No. 3 was used to observe variation in cell resistivity with time depending on the temperature of an electrolyte (or immersion liquid). Specifically, electrodes of Sample No. 3 fabricated under identical conditions were immersed for 84 days in electrolytes of 45° C., 55° C., 65° C., and 75° C., respectively, and the electrodes were taken out of the electrolytes several times during the immersion process and underwent a charging/discharging test similar to that done in test example 1 to obtain cell resistivity and thus observe how it varied with time. A result thereof is shown in FIG. 5. In FIG. 5, the horizontal axis represents the number of days of immersion (in days) and the vertical axis represents cell resistivity ($\Omega cm^2$).

As shown in FIG. 5, for each temperature, an average of an increasing/decreasing cell resistivity range with reference to a cell resistivity measured using an electrode immediately after immersing it in an electrolyte was started (i.e., at day 0 of immersion) was as follows: 45° C.: about 17%; 55° C.: about 15%; 65° C.: about 11%; and 75° C.: about 20%, and there was no substantial temperature dependence observed. It has been found that despite immersion in an electrolyte for 84 days, the substrate that is covered with the conductive portion holding the catalytic portion can be resistant to degradation and the catalytic portion ensures a cell reaction, and stable cell resistivity can thus be obtained.

Test Example 3

Figure 6:
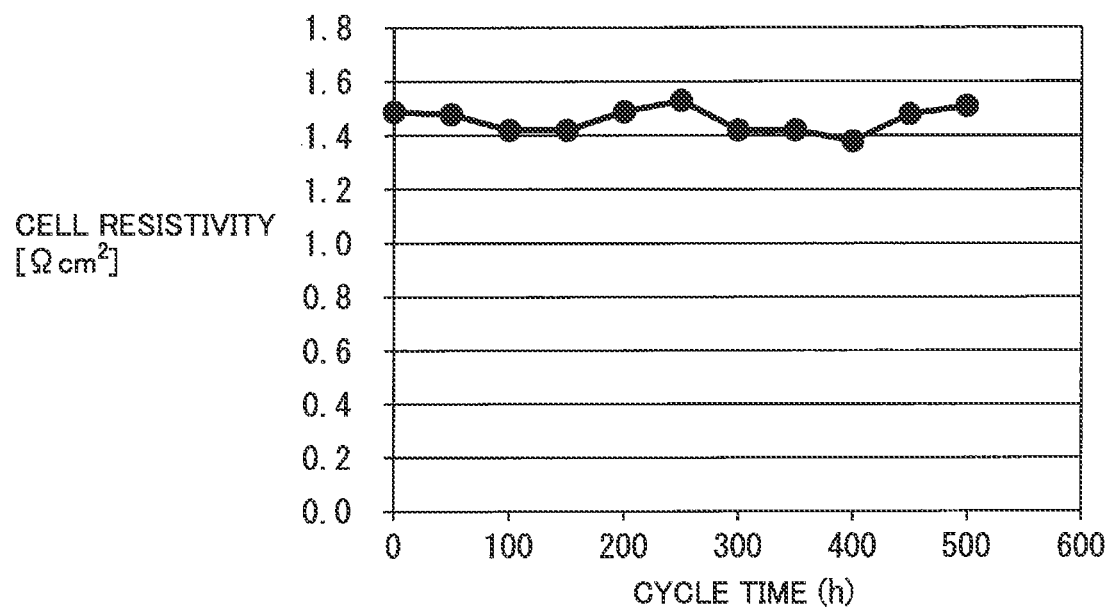
FIG. 6 is a graph representing a result of a cycle test of sample No. 2 in an exemplary test 3.
Figure 7:
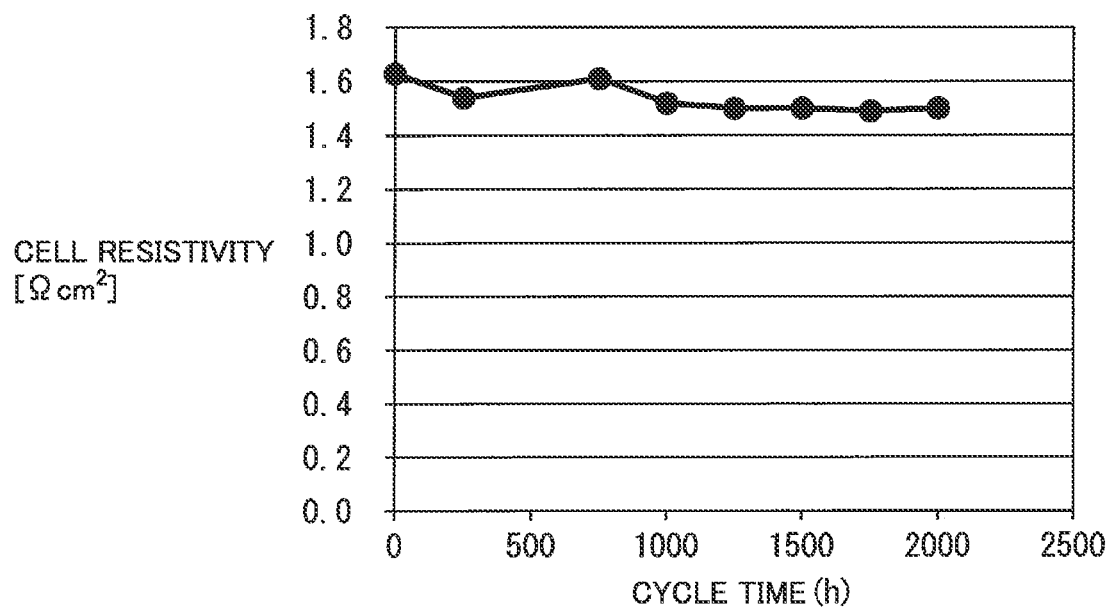
FIG. 7 is a graph representing a result of a cycle test of sample No. 3 in exemplary test 3.
Figure 8:
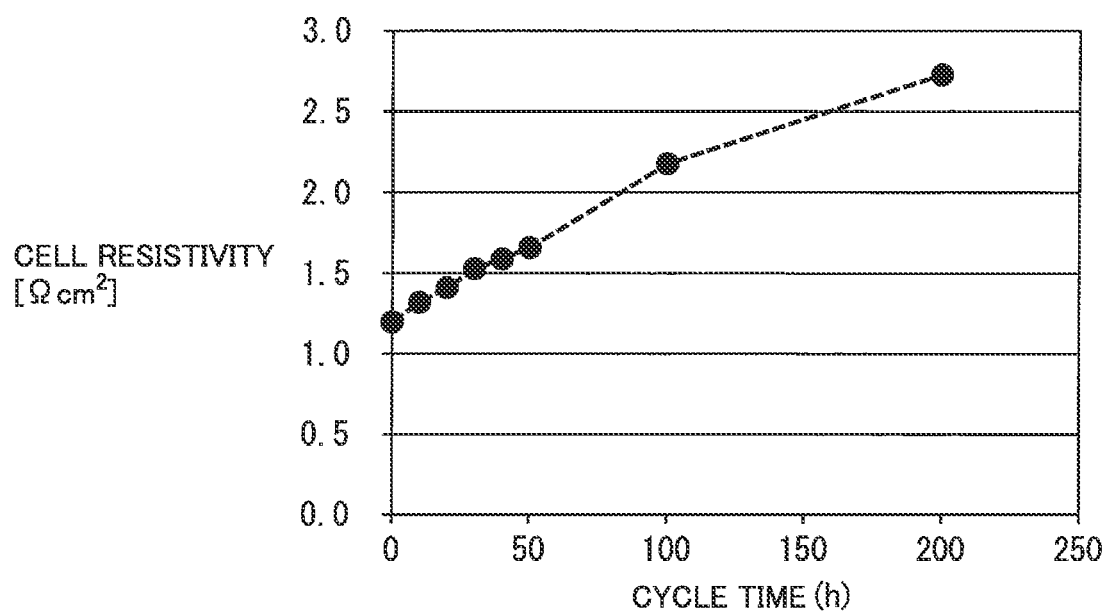
FIG. 8 is a graph representing a result of a cycle test of sample No. 101 in exemplary test 3.

A cycle test was conducted using positive electrodes of sample Nos. 2, 3, and 101. Charging/discharging is performed under a condition similar to that in Test Example 1. The results of sample Nos. 2, 3 and 101 are shown in FIGS. 6, 7 and 8, respectively. In each figure, the horizontal axis represents cycle time (h) and the vertical axis represents cell resistivity ($\Omega cm^2$). As shown in FIGS. 6 and 7, when electrodes of sample Nos. 2 and 3 each including a substrate coated with the conductive portion holding the catalytic portion were used, and each immersed in an electrolyte and immediately (i.e., at day 0 of immersion) used to measure a cell resistivity as a reference cell resistivity, the measured cell resistivity was then observed to increase/decrease within a range of about 10% at the maximum with reference to the reference cell resistivity, and stable cell resistivity was thus obtained while the cycle time elapsed. This is probably because the substrate covered with the conductive portion holding the catalytic portion can be resistant to degradation over a long period of time and the catalytic portion also ensures a cell reaction. On the other hand, as shown in FIG. 8, when the electrode of Sample No. 101 without the catalytic portion or the conductive portion was used, a cell resistivity increasing generally linearly as the cycle time elapses is presented.

Test Example 4

Sample No. 3 was used to observe how cell resistivity varied depending on a difference between electrodes in thickness. In this example, the thickness of the electrode was defined as the thickness of the electrode when it was in a non-compressed state without any external force applied thereto and was also not impregnated with an electrolyte. Specifically, electrodes of 0.2 mm, 0.5 mm, 1.0 mm, 1.5 mm, and 2.5 mm in thickness underwent a charging and discharging test similar to that done in Test Example 1. In this example, the electrodes immediately after immersing them in an electrolyte was started were used. That is, in Test Example 4, how an initial cell resistivity varied by a difference between electrodes in thickness was examined. A result thereof is shown in table 6. Sample No. 8 was used to observe cell resistivity. In this example, the thickness of the electrode was defined as the thickness of the electrode when it was in a non-compressed state without any external force applied thereto and was also not impregnated with an electrolyte. Specifically, an electrode of 0.5 mm in thickness underwent a charging and discharging test similar to that done in Test Example 1. In this example, the electrode immediately after immersing it in an electrolyte was started was used. A result thereof is shown in table 7.

TABLE 6

| thickness (mm) | cell resistivity ($\Omega cm^2$) | conductive resistivity ($\Omega cm^2$) | reactive resistivity ($\Omega cm^2$) |
| --- | --- | --- | --- |
| 0.2 | 1.80 | 0.61 | 1.19 |
| 0.5 | 1.68 | 0.64 | 1.04 |
| 1.0 | 1.49 | 0.68 | 0.81 |
| 1.5 | 1.59 | 0.81 | 0.78 |
| 2.5 | 1.68 | 1.01 | 0.67 |

TABLE 7

| thickness (mm) | cell resistivity ($\Omega cm^2$) | conductive resistivity ($\Omega cm^2$) | reactive resistivity ($\Omega cm^2$) |
| --- | --- | --- | --- |
| 0.5 | 1.72 | 0.63 | 1.09 |

As a result, it has been found that the thicker the electrode is, the larger conductive resistivity is and the smaller reactive resistivity is. Cell resistivity is determined by a sum of conductive resistivity and reactive resistivity, and it is understood that, in order to further reduce cell resistivity, it is preferable that an electrode have a thickness of 0.5 mm or more and 2.5 mm or less, more preferably 1.0 mm or more and 1.5 mm or less.

Test Example 5

Sample No. 3 was used to observe how cell resistivity varied depending on a difference between substrates in fiber diameter. In this example, the substrate's fiber diameter was obtained as follows: an electrode was cut to expose a transverse cross section of the fibers and a microscope was used to examine 5 or more fields of view to measure three or more fibers for each field of view to obtain measurements which were in turn averaged to obtain the fiber diameter. Specifically, electrodes having fiber diameters of 10 μm, 13 μm, 20 μm, and 50 μm underwent a charging and discharging test similar to that done in Test Example 1. In this example, the electrodes immediately after immersing them in an electrolyte was started were used. That is, in Test Example 5, how an initial cell resistivity varied by a difference between substrates in fiber diameter was examined. A result thereof is shown in table 8.

TABLE 8

| fiber diameter (μm) | cell resistivity ($\Omega cm^2$) | conductive resistivity ($\Omega cm^2$) | reactive resistivity ($\Omega cm^2$) |
|---|---|---|---|
| 10 | 0.71 | 0.44 | 0.27 |
| 13 | 0.80 | 0.44 | 0.36 |
| 20 | 0.89 | 0.43 | 0.46 |
| 50 | 1.17 | 0.40 | 0.77 |

As a result, it has been found that the thinner the fiber diameter, the smaller the cell resistivity. It can be seen that conductive resistivity does not show a large difference depending on the fiber diameter, whereas reactive resistivity significantly decreases as the fiber diameter is smaller. This is probably because a fiber having a smaller diameter allows a larger surface area per unit weight and hence a sufficient cell reaction. It can be seen that the fiber diameter is preferably 20 μm or less, more preferably 13 μm or less, and still more preferably, 10 μm or less. On the other hand, an excessively small fiber diameter may impair the fiber aggregate in strength, and accordingly, a fiber diameter of an extent ensuring a prescribed level of strength is recommendable.

Test Example 6

Sample No. 3 was used to observe how cell resistivity varied depending on a difference between substrates in porosity. Specifically, electrodes of 40% by volume, 50% by volume, 70% by volume, 80% by volume, 90% by volume, 98% by volume in porosity underwent a charging and discharging test similar to that done in test example 1. In this example, the electrodes immediately after immersing them in an electrolyte was started were used. That is, in Test Example 6, how an initial cell resistivity varied by a difference between substrates in porosity was examined. A result thereof is shown in table 9.

TABLE 9

| porosity (vol %) | cell resistivity ($\Omega cm^2$) |
|---|---|
| 40 | >3.0 (not chargeable/dischargeable) |
| 50 | 1.26 |
| 70 | 0.98 |
| 80 | 0.89 |
| 90 | 0.87 |
| 98 | 2.80 |

As a result, it has been found that an excessively small porosity as small as 40% by volume results in an increased cell resistivity. This is because excessively small porosity results in an electrolyte poorly flowing. As porosity increases from more than 40% by volume, cell resistivity decreases, however, an excessively large porosity as large as 98% by volume results in an increased cell resistivity. This is because an excessively large porosity results in a substrate having a reduced density and conduction is not ensured. Accordingly, it can be seen that the substrate preferably has a porosity of more than 40% by volume, more preferably 70% by volume or more, 80% by volume or more, particularly preferably 90% by volume or more and less than 98% by volume.

Test Example 7

As a positive electrode, an electrode composed of a composite material comprising a substrate composed of a sintered material including Ti particles, a conductive portion applied to a surface of the substrate, and a catalytic portion held by the conductive portion was prepared and cell resistivity therefor was examined.

Initially, powdery Ti having an average particle size of 100 μm and a molding lubricant were blended so as to have a mass ratio of 99:1 and mixed together, and the resultant powdery mixture was introduced into a die and compressed with a molding pressure of 4 MPa applied thereto to produce a molded body having a size of 30 mm 30 mm and a thickness of 2.5 mm. This molded body was subjected to a heat treatment at 1000° C. for 1 hour in an argon gas atmosphere containing 0.5% by volume of hydrogen to prepare a substrate composed of a sintered material containing Ti particles. This substrate had a porosity of 60% by volume and a weight per unit area of 5000 g/m². Subsequently, such substrates had surfaces coated with coating liquids similar to those of Sample Nos. 1 and 8 using a brush, and underwent a heat treatment similar to that done in Test Example 1 (Sample Nos. 10 and 11).

Sample No. 10 thus obtained was used to observe how cell resistivity varied depending on a difference between electrodes in thickness. In this example, the thickness of an electrode was defined as the thickness of the electrode when it was in a non-compressed state without any external force applied thereto and was also not impregnated with an electrolyte. Specifically, electrodes of 0.2 mm, 0.5 mm, 1.0 mm, 1.5 mm, and 2.5 mm in thickness underwent a charging and discharging test similar to that done in Test Example 1. In this thickness dependence test, the electrodes immediately after immersing them in an electrolyte was started were used. That is, how an initial cell resistivity varied by a difference between electrodes in thickness was examined. A result thereof is shown in table 10. Sample No. 11 thus obtained was used to observe cell resistivity. In this example, the thickness of the electrode was defined as the thickness of the electrode when it was in a non-compressed state without any external force applied thereto and was also not impregnated with an electrolyte. Specifically, an electrode of 0.5 mm in thickness underwent a charging and discharging test similar to that done in Test Example 1. In this test, the electrode immediately after immersing it in an electrolyte was started was used. A result thereof is shown in table 11.

TABLE 10

| thickness (mm) | cell resistivity ($\Omega cm^2$) | conductive resistivity ($\Omega cm^2$) | reactive resistivity ($\Omega cm^2$) |
|---|---|---|---|
| 0.2 | 2.55 | 0.31 | 3.24 |
| 0.5 | 1.29 | 0.37 | 0.92 |
| 1.0 | 1.27 | 0.39 | 0.88 |

TABLE 10-continued

| thickness (mm) | cell resistivity ($\Omega cm^2$) | conductive resistivity ($\Omega cm^2$) | reactive resistivity ($\Omega cm^2$) |
|---|---|---|---|
| 1.5 | 1.06 | 0.41 | 0.65 |
| 2.5 | 1.25 | 0.59 | 0.66 |

TABLE 11

| thickness (mm) | cell resistivity ($\Omega cm^2$) | conductive resistivity ($\Omega cm^2$) | reactive resistivity ($\Omega cm^2$) |
|---|---|---|---|
| 0.5 | 1.14 | 0.36 | 0.78 |

As a result, it has been found that the thicker the electrode is, the larger conductive resistivity is and the smaller reactive resistivity is. Cell resistivity is determined by a sum of conductive resistivity and reactive resistivity, and it is understood that, in order to further reduce cell resistivity, it is preferable that an electrode have a thickness of 0.5 mm or more and 2.5 mm or less, more preferably 1.0 mm or more and 1.5 mm or less.

Figure 9:
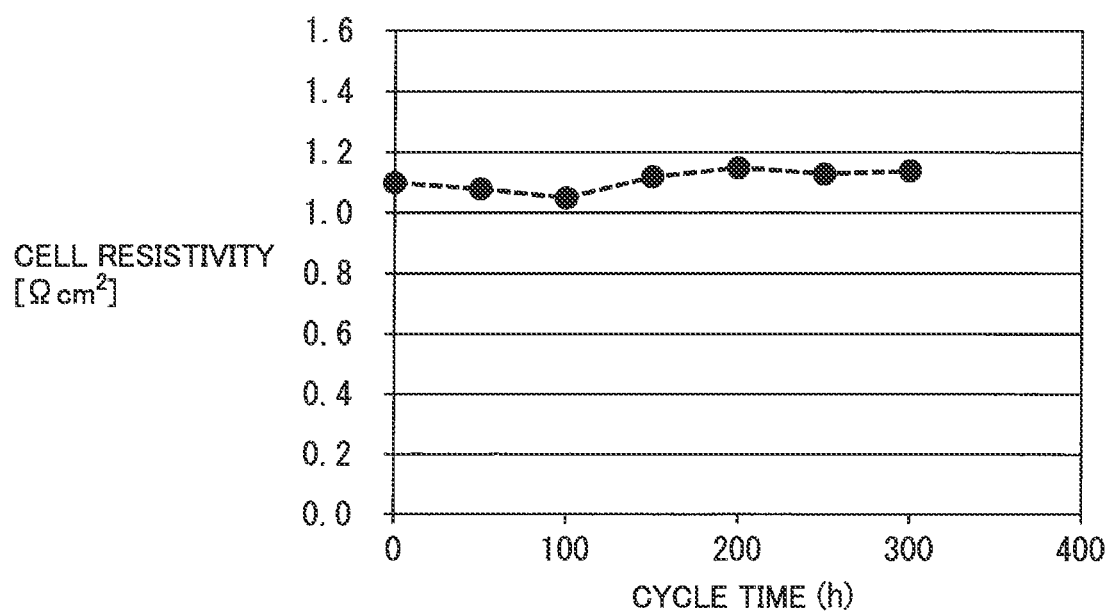
FIG. 9 is a graph representing how cell resistivity varies with time in an exemplary test 7.

Furthermore, Sample No. 10 was subjected, using an electrode of 1.5 mm in thickness, to a cycle test similar to that done in Test Example 3. A result thereof is shown in FIG. 9. In FIG. 9, the horizontal axis represents cycle time (h) and the vertical axis represents cell resistivity ($\Omega cm^2$). As a result, a substrate that was an aggregate of particles also had each particle with a surface coated with the conductive portion holding the catalytic portion, and when an electrode was immersed in an electrolyte and immediately (i.e., at day 0 of immersion) used to measure a cell resistivity as a reference cell resistivity, the measured cell resistivity was then observed to increase/decrease within a range of about 5% at the maximum with reference to the reference cell resistivity, and stable cell resistivity was thus obtained while the cycle time elapsed.

Note that the present disclosure is not limited to these examples, and is intended to include any modifications within the meaning and scope indicated by and equivalent to the terms of the claims. For example, the substrate, the conductive portion and the catalytic portion may have their compositions changed by a specific element and a specific range or the electrolyte may be changed in type.

INDUSTRIAL APPLICABILITY

The electrode for a redox flow battery according to the present disclosure can suitably be used as an electrode of a redox flow battery. The redox flow battery of the present disclosure is suitable for use in storage batteries for power generation using natural energy, such as solar power generation, wind power generation and the like, for the purpose of stabilizing fluctuations in generated power output, storing surplus generated power, load leveling, and the like. In addition, the redox flow battery of the present disclosure can also be used as a storage battery provided in a general power plant and aimed at countermeasures against momentary drop/power failure, and load leveling. In particular, the redox flow battery of the present disclosure can suitably be used for a storage battery with a large capacity for the above-mentioned purposes.

REFERENCE SIGNS LIST

1: redox flow battery (RF battery); 100: battery cell; 11: diaphragm; 10A, 10B: electrode; 110: substrate, 112: conductive portion, 114: catalytic portion; 12: positive electrode, 14: negative electrode; 16: cell flame; 160: bipolar plate, 161: framework; 163,164: liquid feeding hole, 165, 166: liquid draining hole; 170: end plate, 172: coupling member; 101: positive electrode tank, 102: negative electrode tank; 103-106: pipe, 107,108: pump; 200: AC/DC converter; 210: substation facilities; 300: power generation unit; 400: load.

The invention claimed is:

1. An electrode for a redox flow battery, comprising:
    a substrate;
    a conductive portion applied to a surface of the substrate; and
    a catalytic portion held by the conductive portion,
    the conductive portion containing one or more types of elements selected from a group α1 consisting of Sn, Ti, Ta, Ce, In, and Zn,
    the catalytic portion containing one or more types of elements selected from a group β consisting of Ru, Ir, Pd, Pt, Rh, and Au,
    wherein the substrate comprises an aggregate of particles, the particles included in the aggregate have an average particle size of 3 µm or more and 500 µm or less, and the substrate contains one or more types of elements selected from Ti, Ta, and Nb.

2. The electrode for a redox flow battery according to claim 1, wherein a molar ratio of a total constituent element content of the conductive portion and a total constituent element content of the catalytic portion is 30:70 to 95:5.

3. The electrode for a redox flow battery according to claim 1, wherein the conductive portion contains one or more types of elements selected from a group α2 consisting of Nb, Sb, Bi, and P.

4. The electrode for a redox flow battery according to claim 3, wherein the conductive portion has with respect to its total constituent element content a total group α2 constituent element content of 1 mol% or more and 20 mol% or less.

5. The electrode for a redox flow battery according to claim 1, wherein the substrate comprises an aggregate of fibers each having a transverse cross section of 3 µm or more and 100 µm or less as converted into an equivalent circle diameter.

6. The electrode for a redox flow battery according to claim 1, wherein the substrate has a porosity of more than 40% by volume and less than 98% by volume.

7. The electrode for a redox flow battery according to claim 1, having a weight per unit area of 50 g/m² or more and 10000 g/m² or less.

8. The electrode for a redox flow battery according to claim 1, having a thickness of 0.1 mm or more and 5 mm or less.

9. A redox flow battery electrically charged/discharged as a positive electrode electrolyte and a negative electrode electrolyte are supplied to a battery cell comprising a positive electrode, a negative electrode, and a diaphragm interposed between the positive electrode and the negative electrode,
    the positive electrode being the electrode for a redox flow battery according to claim 1,
    the negative electrode being a carbon fiber aggregate.

10. The redox flow battery according to claim 9, wherein the positive electrode electrolyte and the negative electrode electrolyte contain an active material having an oxidation-reduction potential of 0.9 V or more.

11. An electrode for a redox flow battery, comprising:
a substrate;
a conductive portion applied to a surface of the substrate; and
a catalytic portion held by the conductive portion,
the conductive portion containing one or more types of elements selected from a group α1 consisting of Sn, Ti, Ta, Ce, In, and Zn,
the catalytic portion containing one or more types of elements selected from a group β consisting of Ru, Ir, Pd, Pt, Rh, and Au,
wherein the substrate comprises an aggregate of particles, and the particles included in the aggregate have an average particle size of 3 μm or more and 500 μm or less.

* * * * *